United States Patent
Favie et al.

(10) Patent No.: US 9,963,897 B2
(45) Date of Patent: May 8, 2018

(54) POWER LEAD FOR SWIMMING POOL CLEANING ROBOT

(71) Applicant: ZODIAC POOL CARE EUROPE, Paris (FR)

(72) Inventors: Louis Favie, Colomiers (FR); Remi Deloche, Toulouse (FR)

(73) Assignee: ZODIAC POOL CARE EUROPE, Paris (FR)

( * ) Notice: Subject to any disclaimer, the term of this patent is extended or adjusted under 35 U.S.C. 154(b) by 0 days. days.

(21) Appl. No.: 15/319,325

(22) PCT Filed: Oct. 20, 2015

(86) PCT No.: PCT/FR2015/052804
§ 371 (c)(1),
(2) Date: Dec. 15, 2016

(87) PCT Pub. No.: WO2016/062957
PCT Pub. Date: Apr. 28, 2016

(65) Prior Publication Data
US 2017/0234022 A1    Aug. 17, 2017

(30) Foreign Application Priority Data
Oct. 23, 2014  (FR) .................................... 14 60188

(51) Int. Cl.
*E04H 4/16* (2006.01)
*H01R 39/64* (2006.01)
(Continued)

(52) U.S. Cl.
CPC .......... *E04H 4/1654* (2013.01); *H01R 13/523* (2013.01); *H01R 39/643* (2013.01); *H02G 9/12* (2013.01)

(58) Field of Classification Search
CPC .... H01R 12/91; H01R 39/643; H01R 13/523; H02G 9/12
See application file for complete search history.

(56) References Cited

U.S. PATENT DOCUMENTS 3,324,492 A * 6/1967 Myers ..................... A47L 11/00
                                                              15/1.7
3,686,534 A * 8/1972 Cook, Jr. ............. H01R 13/713
                                                              200/61.04
(Continued)

FOREIGN PATENT DOCUMENTS

AU     2008202422    6/2008
EP        1022411    7/2000
(Continued)

OTHER PUBLICATIONS

French Patent Application No. 14 60188, Preliminary Search Report, dated Jun. 30, 2015, 7 pages.
(Continued)

*Primary Examiner* — Edwin A. Leon
*Assistant Examiner* — Oscar Jimenez
(74) *Attorney, Agent, or Firm* — Kilpatrick Townsend & Stockton LLP; Dean W. Russell

(57) ABSTRACT

The invention relates to a power lead for a swimming pool cleaning robot. Said power lead comprises a rotary connector and a buoyancy means supporting said rotary connector. An upper part of said buoyancy means is a cap shaped to slide under a swimming pool cover, under the effect of a traction exerted by the swimming pool cleaning robot on the buoyancy means through the power lead.

6 Claims, 2 Drawing Sheets

Figure 1:
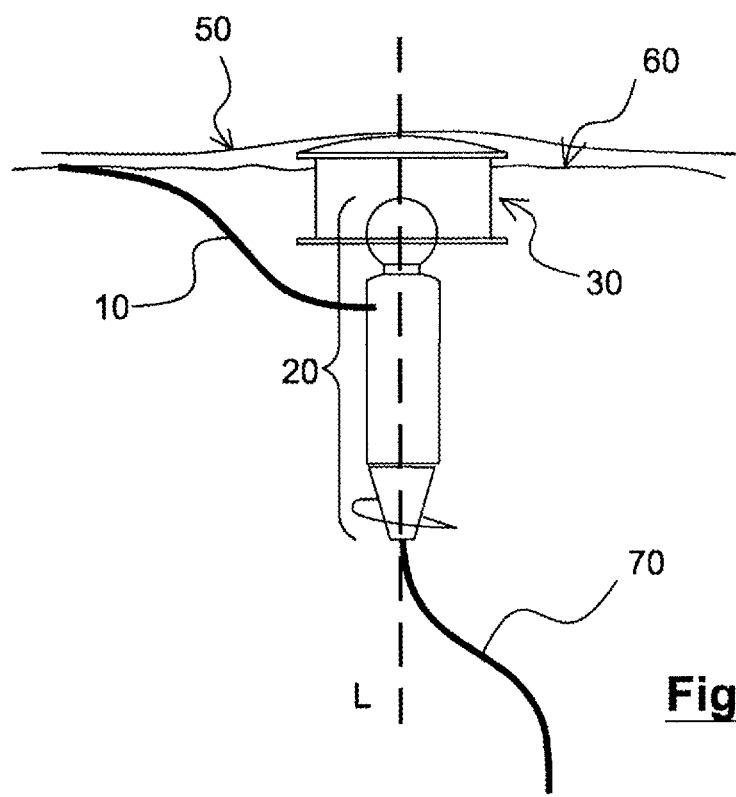

(51) Int. Cl.
　　*H02G 9/12*　　　(2006.01)
　　*H01R 13/523*　　(2006.01)

(56) References Cited

U.S. PATENT DOCUMENTS

| | | | | | |
|---|---|---|---|---|---|
| 4,284,904 | A | * | 8/1981 | Tetro | G01F 23/70 206/716 |
| 4,431,538 | A | * | 2/1984 | Selsted | E04H 4/1263 134/167 R |
| 4,461,704 | A | * | 7/1984 | Selsted | E04H 4/1263 134/16 |
| 4,784,171 | A | * | 11/1988 | Campbell | E04H 4/16 134/167 R |
| 5,915,974 | A | * | 6/1999 | Carter | H01R 35/04 439/13 |
| 6,814,580 | B2 | * | 11/2004 | Li | H01R 39/643 439/446 |
| 6,848,862 | B1 | * | 2/2005 | Schlig | B63B 22/18 116/107 |
| 7,317,162 | B2 | * | 1/2008 | Kaady | H01R 13/6392 174/91 |
| 7,838,787 | B2 | * | 11/2010 | Balsells | F16B 21/078 200/277 |
| 7,874,023 | B1 | * | 1/2011 | Sundling | E04H 4/105 4/498 |
| 2002/0166804 | A1 | | 11/2002 | Henkin et al. | |
| 2014/0273540 | A1 | * | 9/2014 | Brown | H01R 39/64 439/13 |
| 2014/0273541 | A1 | | 9/2014 | Sumonthee et al. | |
| 2016/0013603 | A1 | * | 1/2016 | Hui | H01R 13/5205 439/13 |

FOREIGN PATENT DOCUMENTS

| | | |
|---|---|---|
| EP | 1207594 | 5/2002 |
| FR | 2870281 | 11/2005 |
| WO | 2016062890 | 4/2016 |

OTHER PUBLICATIONS

International Patent Application No. PCT/FR2015/052804, International Search Report and Written Opinion, dated Feb. 8, 2016, 11 pages.

Australian Patent Application No. 2015334753, Examination Report No. 1, dated Jan. 3, 2017, 2 pages.

* cited by examiner

POWER LEAD FOR SWIMMING POOL CLEANING ROBOT

CROSS-REFERENCE TO RELATED APPLICATIONS

This is a U.S. national phase under 35 U.S.C. 371 of International Patent Application No. PCT/FR2015/052804, titled "Cable D'Alimentation Pour un Robot de Nettoyage de Piscine" and filed Oct. 20, 2015, which claims priority to French Patent Application No. 1460188, titled "Cable D'Alimentation Pour un Robot de Nettoyage de Piscine" and filed Oct. 23, 2014, the entirety of each of which is incorporated herein by reference.

TECHNICAL FIELD

The field of the invention is the field of swimming pool accessories. More specifically, the invention relates to a power lead for a swimming pool cleaning robot.

PRIOR ART

In the field of swimming pools there are notably robots that enable the surfaces of swimming pools to be cleaned. These robots are submerged in the swimming pools.

At the present time, the robot is controlled by a control device that is not submerged in the pool. In order to supply electrical power to the robot, the control device is connected to the robot by a power lead.

The robot is directed to clean the surfaces of the swimming pool such as a bottom surface and lateral surfaces. The robot therefore has to move around a great deal in the swimming pool.

The numerous movements of the robot comprise rotations of the robot on itself and circular paths in the swimming pool which cause the power lead to become tangled and/or twisted.

When the power lead is twisted, the power lead finds its length decreased so that it can no longer cover the same area of swimming pool as it could when said power lead was not twisted.

In addition, this twisting and tangling very greatly increases power lead wear.

Finally, when the power lead is tangled, the power lead has to be untangled by hand, entailing the presence of a user to take the robot out of the swimming pool and switch it off.

SUMMARY OF THE INVENTION

It is an objective of the present invention to overcome all or some of the disadvantages of the prior art, notably those set out hereinabove, by proposing a solution that allows the creation of twists and tangles in a supply lead to be very greatly limited.

To this end, the present invention proposes a power lead for a swimming pool cleaning robot. Said power lead comprises a rotary connector and a buoyancy means supporting said rotary connector. Said rotary connector is designed to allow said power lead to rotate about its longitudinal axis. Advantageously, the power lead that forms the subject of the invention can be used under a swimming pool cover such as a swimming pool tarpaulin for example.

Thus, by virtue of the buoyancy means, the rotary connector which is connected to said buoyancy means is situated substantially level with the waterline. The waterline means the water level. Positioning the rotary connector at the waterline rather than at a depth means that the rotary connector can be prevented from passing under the power lead and causing the power lead to become tangled.

Such arrangements allow the power lead to be caused to drop substantially vertically on top of the robot. Thus, the robot experiences no lateral force caused by said power lead and is therefore unimpeded in its movements.

In particular embodiments of the invention, said power lead may additionally comprise one or more of the following features, considered in isolation or in any technically feasible combination.

According to one advantageous feature of the invention, an upper part of said buoyancy means is a smooth and convex cap. Said shape of said upper part of said buoyancy means helps the buoyancy means to slide more easily under a swimming pool cover such as a swimming pool tarpaulin for example. In particular embodiments of the invention, said cap is shaped to slide under a swimming pool cover, under the effect of a traction exerted by the swimming pool cleaning robot on the buoyancy means through the power lead.

In particular embodiments of the invention, said power lead comprises a projection supported by said buoyancy means. A projection means a protrusion appearing at the surface of something, in this instance at the surface of said buoyancy means.

In a preferred embodiment of the invention said projection is situated on top of said buoyancy means. For preference, said projection can be extracted from said buoyancy means. Extracting said protrusion is preferentially advantageous when the swimming pool is covered with a cover such a tarpaulin or a curtain. For preference, said projection is situated out of the water of said swimming pool.

In one preferred embodiment of the invention, said power lead comprises two rotary connectors situated at right angles to one another.

Positioning said two rotary connectors at right angles to one another allows each of the leads leaving each rotary connector to move without acting on the lead of the other rotary connector.

According to one advantageous feature of the invention, said power lead is torsionally rigid.

In one preferred embodiment of the invention, said rotary connector is connected to said buoyancy means by a two-DoF (Degrees of Freedom) ball joint. Such a joint allows the rotary connector to rotate about two axes of rotation. The rotation of said rotary connector about a transverse axis of said rotary connector is not permitted. Said two-DoF ball joint allows said buoyancy means to be kept in a plane substantially parallel to the plane of the waterline, and this prevents said buoyancy means from passing under the power lead.

INTRODUCTION TO THE FIGURES

Figure 2:
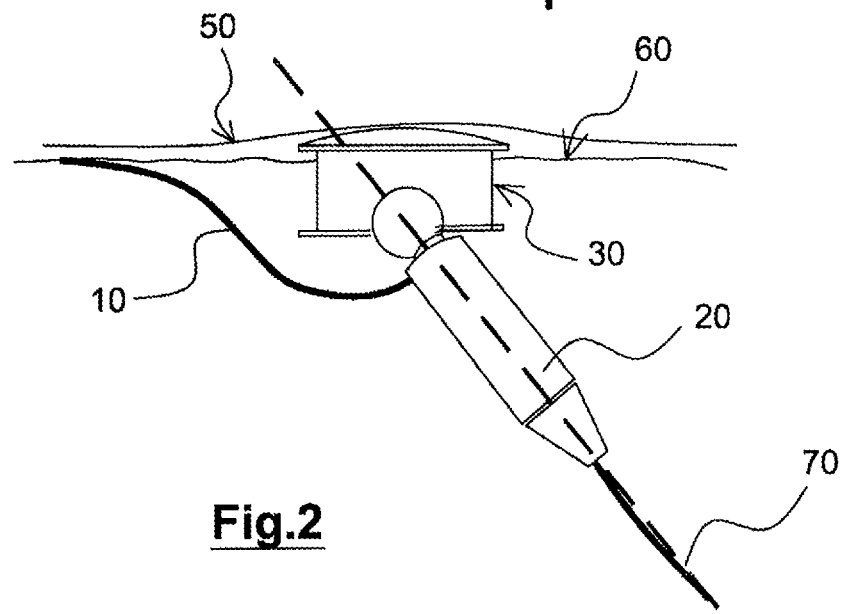
Figure 3:
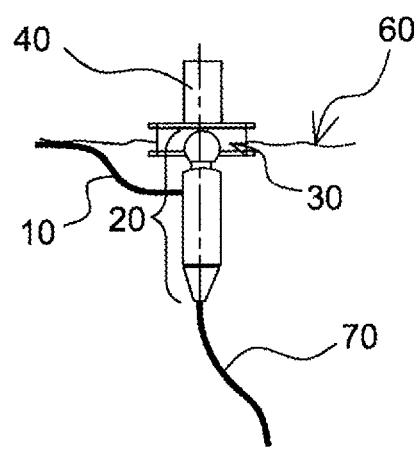

The invention will be better understood from reading the following description, given by way of entirely nonlimiting example, and with reference to FIGS. 1 to 3 which depict:

FIG. 1: a view of one example of a power lead of a swimming pool cleaning robot according to the invention, used under a swimming pool cover.

FIG. 2: another view of the example of FIG. 1 of the power lead according to the invention used under a swimming pool cover.

FIG. 3: a view of one example of a power lead according to the invention, used in a swimming pool with no cover on said swimming pool.

In these figures, references that are identical from one figure to another denote elements which are identical or analogous. For the sake of clarity, the elements depicted are not drawn to scale, unless otherwise indicated.

DETAILED DESCRIPTION OF EMBODIMENTS OF THE INVENTION

One nonlimiting embodiment of the invention is now described in detail in an application to the case of a power lead of a swimming pool cleaning robot.

The swimming pool cleaning robot (not depicted in the figures) is submerged in an area formed by the walls of a pool such as the walls of a swimming pool for example.

The robot is controlled by a control device (not depicted in the figures) which is situated out of the water. The control device is connected by a first power lead 10 to a rotary connector 20. The first power lead 10 can float and is situated at the surface 60 of the swimming pool. The rotary connector 20 is connected by a second power lead 70 to the swimming pool cleaning robot. The second power lead 70 is preferably relatively short in comparison with the first power lead 10 so that the second power lead 70 does not become entangled as it makes the robot turn. In one embodiment of the invention in which the swimming pool is 3 m deep, the first power lead 10 has a length of between 10 m and 15 m and the second power lead has a length of 3.5 m. In a preferred embodiment of the invention, the second power lead 70 is relatively rigid and difficult to twist.

The rotary connector 20 comprises a fixed part and a part capable of rotational movement about a longitudinal axis of the rotary connector 20. In the preferred embodiment of FIG. 1, the fixed part is situated at the upper part of the rotary connector 20 and the movable part at the lower part of the rotary connector 20. This siting of the fixed and mobile parts of the rotary connector 20 illustrates the normal conditions of use of the rotary connector 20.

In the example of FIG. 1, the first power lead 10 is connected to the rotary connector 20 at the fixed part of the rotary connector 20. More specifically, the first power lead 10 is connected to the rotary connector 20 at the level of a lateral part of the rotary connector 20.

In a preferred embodiment of the invention which is illustrated in FIG. 1, the second power lead 70 is connected to the rotary connector 20 at the level of the mobile part. More specifically, the second power lead 70 is connected to the rotary connector 20 by a lower part of the rotary connector 20.

FIG. 1 illustrates an example of a first power lead 10 that can be used under a floating cover 50 of a swimming pool basin. The floating cover 50 of the swimming pool basin may for example be a bubble cover or a curtain.

The first power lead 10 comprises a buoyancy means 30. In the example of FIG. 1, the buoyancy means 30 is of parallelepipedal shape but other shapes may suit. The buoyancy means 30 comprises a material that allows the buoyancy means 30 to float. In a preferred embodiment of the invention, the buoyancy means 30 is notably made of expanded polystyrene. Expanded polystyrene has a density of between 15 kg/m$^3$ and 25 kg/m$^3$ advantageously allowing the buoyancy means 30 to float. In one embodiment of the invention, the rotary connector 20 is connected to the buoyancy means 30 at the level of the fixed part of the rotary connector 20. Thanks to the buoyancy means 30, under normal conditions of use of the rotary connector 20 and when the robot is not pulling on the second power lead 70, the rotary connector 20 has a position substantially perpendicular to the surface 60 of the swimming pool.

In a preferred embodiment of the invention, the buoyancy means 30 comprises, at the level of the upper part, a cap. In particular embodiments of the invention, said cap is shaped to slide under a swimming pool cover, under the effect of a traction exerted by the swimming pool cleaning robot on the buoyancy means 30 through the power lead 70. In particular embodiment of the invention, the swimming pool cleaning robot has a power consumption of 150 watts for its pump and its moving means. This value is given for illustrative and not restrictive.

In particular embodiments of the invention, the cap is smooth and convex.

Thereby, the cap advantageously helps the buoyancy means 30 to slide under the cover 50 of the swimming pool. In a preferred embodiment of the invention, the smooth and convex cap can be extracted from the buoyancy means 30. In particular embodiments of the invention, the cap outcrop the water surface by its edges. In the present application, we use the term "edges" of the cap to define the cutting edge around the cap. In some embodiments of the invention, the edges of the cap are at a distance from the surface of the water less than or equal to 2 cm. The cap is advantageously not hemispherical. In some embodiments of the inventions, the cap has an angle less than 45° relative to the horizontal. According to particular embodiments, the height of the cap is less than or equal to 5 cm from the plane formed by the edges of the cap, preferably less than or equal to 3 cm, even more preferably less than or equal to 2.5 cm, More the cap is low rise, less slip resistance it will be imposed by a cover 50 of the swimming pool covering the cap.

There are different types of swimming pool cover 50, for example covers 50 of the rigid type and covers 50 of the soft type. An example of soft swimming pool covers 50 is the well known bubble cover best known under the name of bubble tarpaulin. The cap of the buoyancy means 30 is usually smaller in height (for example, between 0.5 cm and 1.5 cm) when the present invention is used under a rigid swimming pool cover 50 compared with when it is used under a soft swimming pool cover 50 where the cap can be of greater height (for example, greater than or equal to 2 cm). This is explained by the fact that, for a same cap height, a rigid swimming pool cover 50 usually has a greater resistance to sliding of the cap that it covers over a soft swimming pool cover 50.

In one preferred embodiment of the invention, the rotary connector 20 comprises a ball joint situated at the upper part of said rotary connector 20. More specifically, the ball joint is situated above the fixed part of said rotary connector 20 when the rotary connector 20 is used under normal conditions of use and when the robot is not pulling on the second power lead 70, namely when the rotary connector 20 is substantially perpendicular to the surface 60 of the swimming pool.

The ball joint of the rotary connector 20 can fit inside the buoyancy means 30.

The connection between the rotary connector 20 and the buoyancy means 30 is a 2-DoF ball joint connection. This 2-DoF ball joint allows the rotary connector 20 to rotate about two axes. This 2-DoF ball joint allows the rotary connector 20 to rotate about the longitudinal axis "L" of the rotary connector 20. The rotation of the rotary connector 20 is depicted in FIG. 1. By contrast, the 2-DoF ball joint does not allow the rotary connector 20 to rotate about a transverse axis of the rotary connector 20.

FIG. 2 depicts the first power lead 10 of FIG. 1 in which the robot, having moved, has altered the position of the rotary connector 20. Specifically, the rotary connector 20 of FIG. 2 is at an angle of around 45 degrees with respect to the axis of the rotary connector 20 of FIG. 1.

FIG. 3 depicts an example of a power lead that can be used with a swimming pool basin that has no cover 50.

The device that forms the subject of the invention comprises a projection 40 when the swimming pool has no cover 50 over the swimming pool basin. In one embodiment of the invention, the projection 40 is a hollow tube 4 cm in diameter and 12 cm tall. In a preferred embodiment of the invention, the projection 40 is made at least of a material that allows the projection 40 to float. For preference, at least one material used to manufacture the projection 40 is expanded polystyrene. In a preferred embodiment of the invention, the buoyancy means 30 does not have a smooth and convex cap at its upper part. The buoyancy means 30 is preferably connected at the upper part to the projection 40. In the example of FIG. 3, the projection 40 is situated out of the water. In a preferred embodiment of the invention, the projection 40 can be extracted from the buoyancy means 30, thus allowing the power lead that forms the subject of the invention to be used with and without a cover 50 over the swimming pool basin.

The projection 40 improves the effects of the buoyancy means 30 which make it possible to prevent the robot from passing under the first power lead 10 and therefore make it possible to prevent tangles such as loops from being created around the first power lead 10.

The description hereinabove clearly illustrates that, through its various features and the advantages thereof, the present invention achieves the objectives it had set itself. In particular, the addition of a buoyancy means to the first power lead 10 means that the robot can be kept at maximum effectiveness and the first power lead 10 can be preserved over time. Thanks to the buoyancy means 30 and/or to the projection 40, the first power lead 10 no longer becomes tangled, whereas without the buoyancy means 30 and/or without the projection 40, the first power lead 10 becomes tangled at least 3 to 5 times during a swimming pool cleaning robot operating time of around 3 hours.

The invention claimed is:

1. A power lead for a swimming pool cleaning robot, said power lead comprising a rotary connector including a ball joint and a buoyancy means supporting said rotary connector, wherein an upper part of said buoyancy means is a cap shaped to slide under a swimming pool cover, under the effect of a traction exerted by the swimming pool cleaning robot on the buoyancy means through the power lead, and wherein the buoyancy means defines a recess configured to receive the ball joint so as to allow the rotary connector to move with two degrees of freedom.

2. The power lead according to claim 1, comprising a projection supported by said buoyancy means.

3. The power lead according to claim 2, wherein said projection can be extracted from said buoyancy means.

4. An assembly for use in a swimming pool, comprising:
   a. a first power lead configured for connection to a control device;
   b. a second power lead configured for connection to a swimming pool cleaning robot;
   c. a rotary connector defining a longitudinal axis and comprising:
      i. an upper part (A) defining a ball joint and (B) connected to the first power lead; and
      ii. a lower part (A) configured to rotate about the longitudinal axis and (B) connected to the second power lead; and
   d. a buoyancy means defining a recess configured to receive the ball joint so as to allow the rotary connector to move with two degrees of freedom.

5. The assembly according to claim 4, wherein the buoyancy means comprises a smooth, convex cap configured to slide under a cover of the swimming pool.

6. The assembly according to claim 4, wherein the upper part is configured to be rotationally fixed about the longitudinal axis.

* * * * *